(12) United States Patent
Salter et al.

(10) Patent No.: US 11,781,369 B2
(45) Date of Patent: Oct. 10, 2023

(54) RUNNING BOARD ACTIVATED VEHICLE POWERED CLOSURE MEMBER SYSTEMS

(71) Applicant: FORD GLOBAL TECHNOLOGIES, LLC, Dearborn, MI (US)

(72) Inventors: Stuart C. Salter, White Lake, MI (US); Kristopher Karl Brown, Dearborn, MI (US); Heather Woycik, Ferndale, MI (US); Paul Kenneth Dellock, Northville, MI (US); Hussein Berry, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 117 days.

(21) Appl. No.: 17/406,840

(22) Filed: Aug. 19, 2021

(65) Prior Publication Data
US 2023/0053760 A1 Feb. 23, 2023

(51) Int. Cl.
*E05F 15/75* (2015.01)
*B60R 3/00* (2006.01)

(52) U.S. Cl.
CPC ............. *E05F 15/75* (2015.01); *B60R 3/002* (2013.01); *E05Y 2400/44* (2013.01); *E05Y 2400/45* (2013.01); *E05Y 2900/531* (2013.01)

(58) Field of Classification Search
None
See application file for complete search history.

(56) References Cited

U.S. PATENT DOCUMENTS

| | | | | |
|---|---|---|---|---|
| 9,605,470 B2* | 3/2017 | Matsumoto | ............ | G01D 11/16 |
| 9,802,545 B1* | 10/2017 | Salter | ........................ | B60R 3/02 |
| 9,963,066 B1* | 5/2018 | Salter | ..................... | B60Q 1/325 |
| 10,336,260 B1* | 7/2019 | Salter | ........................ | B60R 3/02 |
| 10,377,300 B1* | 8/2019 | Salter | ..................... | B60Q 1/323 |
| 10,539,285 B1* | 1/2020 | Johnson | .................. | G02B 5/02 |
| 10,576,879 B1* | 3/2020 | Salter | ..................... | B60Q 1/325 |
| 11,225,195 B2* | 1/2022 | Nagase | ................... | E05F 15/41 |
| 11,299,927 B2* | 4/2022 | Nagase | ............... | H03K 17/955 |
| 2007/0188122 A1* | 8/2007 | Andrejciw | ............. | E05F 15/75 |
| | | | | 318/483 |
| 2010/0194070 A1* | 8/2010 | Stauffer | .................. | B60R 3/002 |
| | | | | 280/166 |
| 2015/0283886 A1* | 10/2015 | Nania | ..................... | E05F 15/73 |
| | | | | 49/31 |

(Continued)

FOREIGN PATENT DOCUMENTS

| | | |
|---|---|---|
| CN | 202055654 U | 11/2011 |
| CN | 208411666 U | 1/2019 |
| WO | 2020222113 A1 | 11/2020 |

*Primary Examiner* — Marcus Menezes
(74) *Attorney, Agent, or Firm* — Vichit Chea; Carlson, Gaskey & Olds, P.C.

(57) ABSTRACT

Motor vehicles may be equipped with running board activated powered closure member systems. A powered opening or closing sequence of a closure member may be initiated by activating a running board assembly of the powered closure member system in response to a user input. The user input can be provided by a limb of the user, for example. In some embodiments, the running board assembly may include integrated sensors for receiving the user input. In other embodiments, the running board assembly may be configured to function as a switch for receiving the user input.

19 Claims, 9 Drawing Sheets

(56) References Cited

U.S. PATENT DOCUMENTS

| | | | |
|---|---|---|---|
| 2016/0083995 A1* | 3/2016 | Dezorzi | B60R 25/241 |
| | | | 340/5.72 |
| 2017/0241187 A1* | 8/2017 | Takayanagi | E05F 15/75 |
| 2019/0128022 A1* | 5/2019 | Markway | E05B 17/22 |
| 2019/0248219 A1* | 8/2019 | Dellock | B60Q 1/2661 |
| 2020/0022225 A1* | 1/2020 | Dellock | B60R 3/002 |
| 2020/0238916 A1* | 7/2020 | Nagase | E05F 15/73 |
| 2022/0018688 A1* | 1/2022 | Koda | B60R 25/2054 |
| 2023/0016866 A1* | 1/2023 | Ottino | E05B 85/26 |

* cited by examiner

RUNNING BOARD ACTIVATED VEHICLE POWERED CLOSURE MEMBER SYSTEMS

TECHNICAL FIELD

This disclosure relates generally to vehicle systems, and more particularly to powered closure member systems that may be activated via a vehicle running board for moving a closure member between closed and open positions.

BACKGROUND

A motor vehicle typically includes one or more closure members. Exemplary closure members are doors and liftgates. Generally, closure members can move back and forth between open and closed positions relative to a body structure of the vehicle in order to provide vehicle ingress/egress. Some closure members can be moved with actuators, such as power hinges. The actuators may be activated via motion or kick sensors that open the closure member in response to detecting motion of a user's limb.

SUMMARY

A powered closure member system for a vehicle according to an exemplary aspect of the present disclosure includes, among other things, a closure member and a running board assembly configured to initiate a powered opening or closing sequence of the closure member.

In a further non-limiting embodiment of the forgoing powered closure member system, the running board assembly includes a first sensor configured to receive a user input for initiating the powered opening or closing sequence of the closure member.

In a further non-limiting embodiment of either of the foregoing powered closure member systems, the running board assembly includes a second sensor configured to receive a second user input for initiating a second powered opening or closing sequence of a second closure member.

In a further non-limiting embodiment of any of the foregoing powered closure member systems, the first sensor is integrated within a running board of the running board assembly and is a capacitive sensor.

In a further non-limiting embodiment of any of the foregoing powered closure member systems, the first sensor is mounted to a running board of the running board assembly and is a membrane switch.

In a further non-limiting embodiment of any of the foregoing powered closure member systems, an actuator system is configured to move the closure member from a closed position to an open position or from the open position to the closed position in response to initiating the powered opening or closing sequence.

In a further non-limiting embodiment of any of the foregoing powered closure member systems, a control module is programmed to command the actuator system to move the closure member to the open position in response to receiving notification of a user input for initiating the powered opening sequence of the closure member.

In a further non-limiting embodiment of any of the foregoing powered closure member systems, the control module is programmed to distinguish between the user input for initiating the powered opening sequence and a second user input that is not designed to initiate the powered opening sequence.

In a further non-limiting embodiment of any of the foregoing powered closure member systems, the control module is programmed to determine that the second user input has been received based on an amount of time a sensor of the running board assembly has been actuated or based on a measured amount of weight being applied to the running board assembly.

In a further non-limiting embodiment of any of the foregoing powered closure member systems, a running board of the running board assembly is configured to function as a switch for initiating the powered opening or closing sequence of the closure member.

In a further non-limiting embodiment of any of the foregoing powered closure member systems, the running board is configured to receive a user input for moving the running board from a partially deployed position to a fully deployed position. A motor of the running board is configured to supply a current necessary for raising the running board back to the partially deployed position.

In a further non-limiting embodiment of any of the foregoing powered closure member systems, a control module is configured to determine that the switch has been activated when the running board returns to the partially deployed position in response to the current.

A powered closure member system for a vehicle according to another exemplary aspect of the present disclosure includes, among other things a closure member, an actuator system configured to move the closure member between a closed position and an open position, a running board assembly configured to receive a user input for indicating that a powered opening or closing sequence of the closure member has been initiated, and a control module programmed to command the actuator system to move the closure member to the open position or the closed position in response to the user input.

In a further non-limiting embodiment of the foregoing powered closure member system, the closure member is a side door of the vehicle.

In a further non-limiting embodiment of either of the forgoing powered closure member systems, the running board assembly includes a capacitive sensor configured to receive the user input for initiating the powered opening or closing sequence.

In a further non-limiting embodiment of any of the foregoing powered closure member systems, a running board of the running board assembly includes a thermoplastic olefin, and the capacitive sensor includes a conductive polymer that is encapsulated within the thermoplastic olefin.

In a further non-limiting embodiment of any of the foregoing powered closure member systems, the user input includes placement of a limb of the user on a running board deck of the running board assembly.

In a further non-limiting embodiment of any of the foregoing powered closure member systems, the control module is programmed to distinguish between the user input for initiating the powered opening or closing sequence and a second user input that is not intended to initiate the powered opening or closing sequence.

In a further non-limiting embodiment of any of the foregoing powered closure member systems, a running board of the running board assembly is configured to function as a switch for initiating the powered opening or closing sequence of the closure member.

In a further non-limiting embodiment of any of the foregoing powered closure member systems, the control module is programmed to determine that the switch has been activated subsequent to the user input when the running board moves from a fully deployed position to a partially deployed position in response to a current supplied by a motor of the running board assembly.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details motor vehicles equipped with running board activated powered closure member systems. A powered opening or closing sequence of a closure member may be initiated by activating a running board assembly of the powered closure member system in response to a user input. The user input can be provided by a limb of the user, for example. In some embodiments, the running board assembly may include integrated sensors for receiving the user input. In other embodiments, the running board assembly may be configured to function as a switch for receiving the user input. These and other features of this disclosure are described in greater detail in the following paragraphs of this detailed description.

Figure 1:
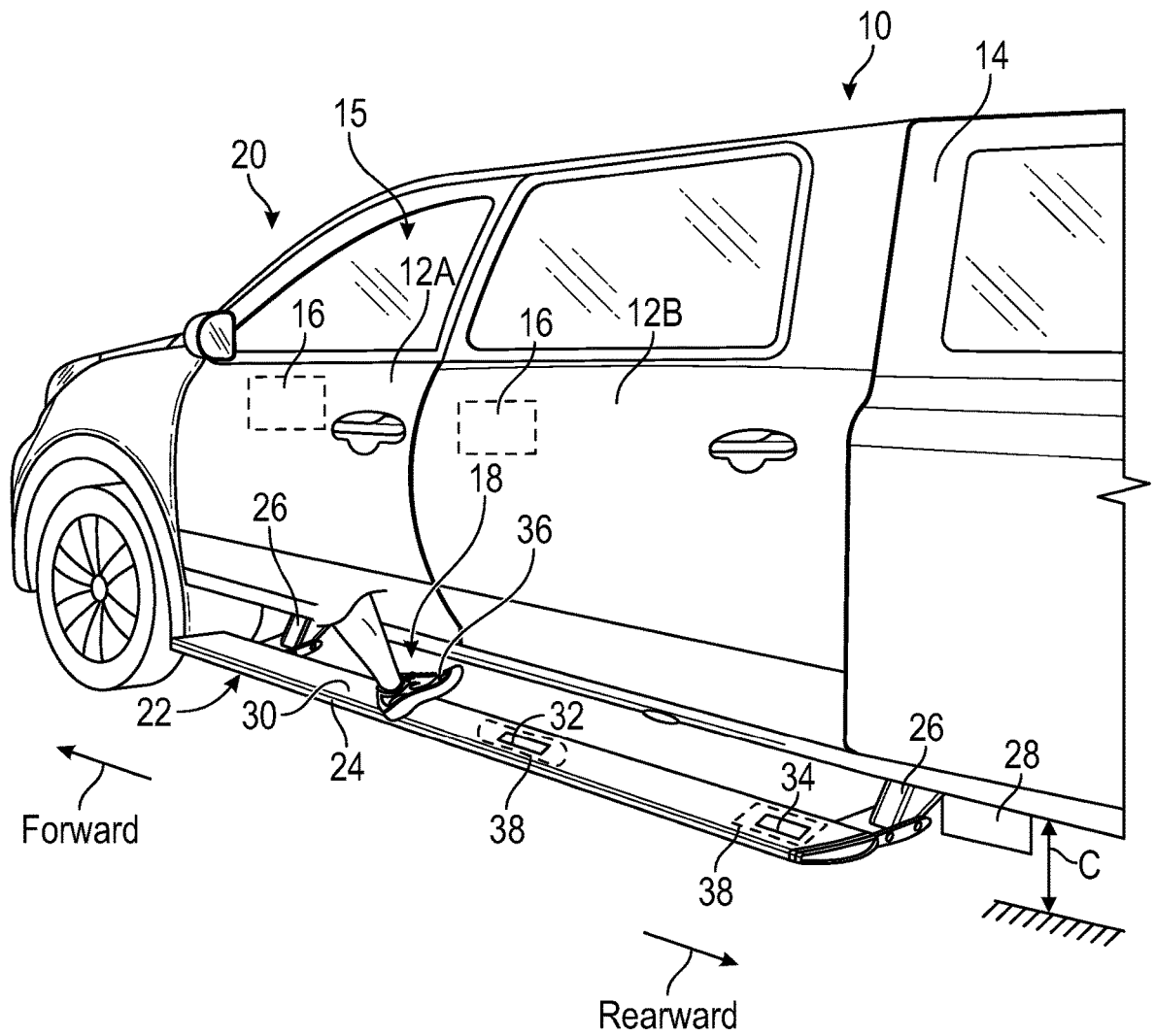
FIG. 1 illustrates a motor vehicle equipped with a powered closure member system. Closure members of the system are shown in closed positions in FIG. 1.
Figure 2:
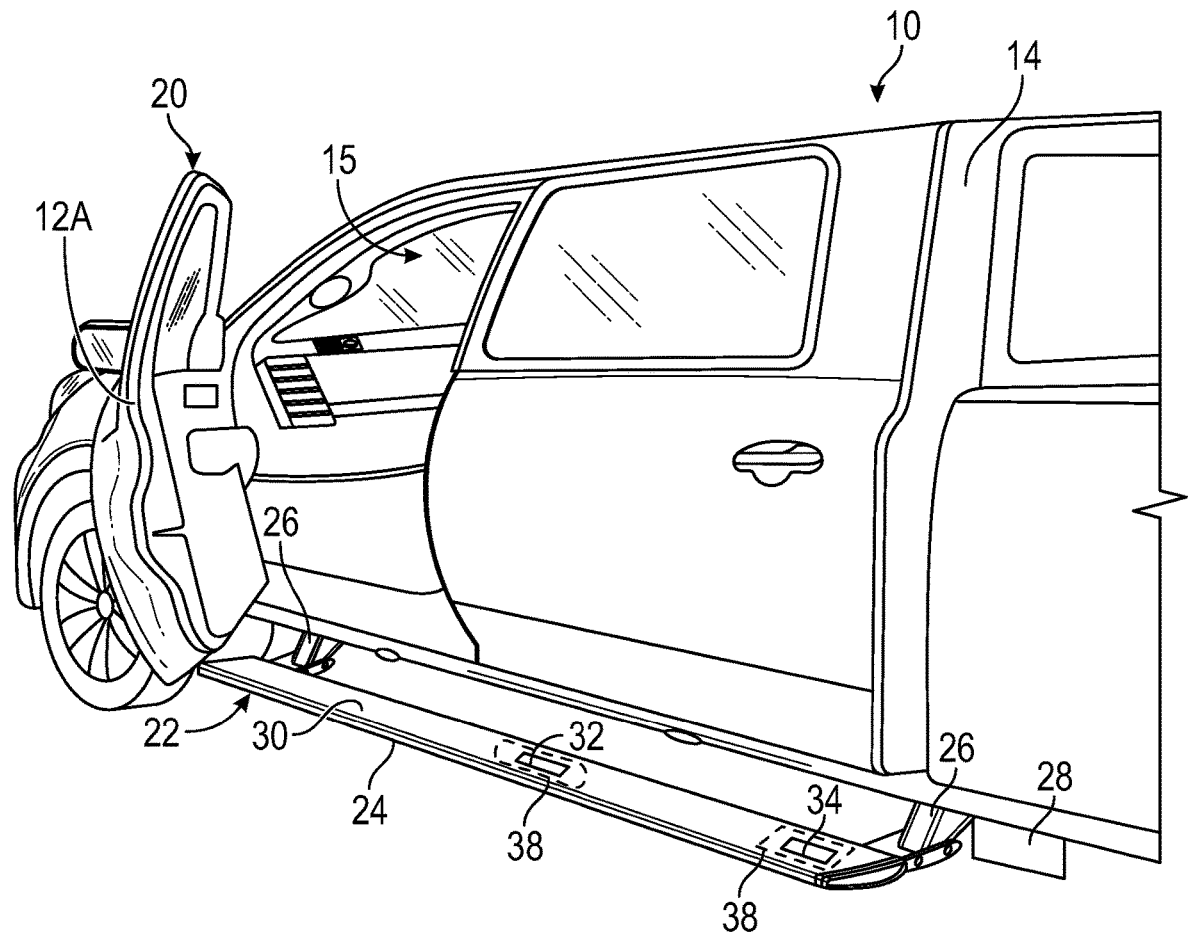
FIG. 2 illustrates an open position of a first closure member of the powered closure member system of FIG. 1.
Figure 3:
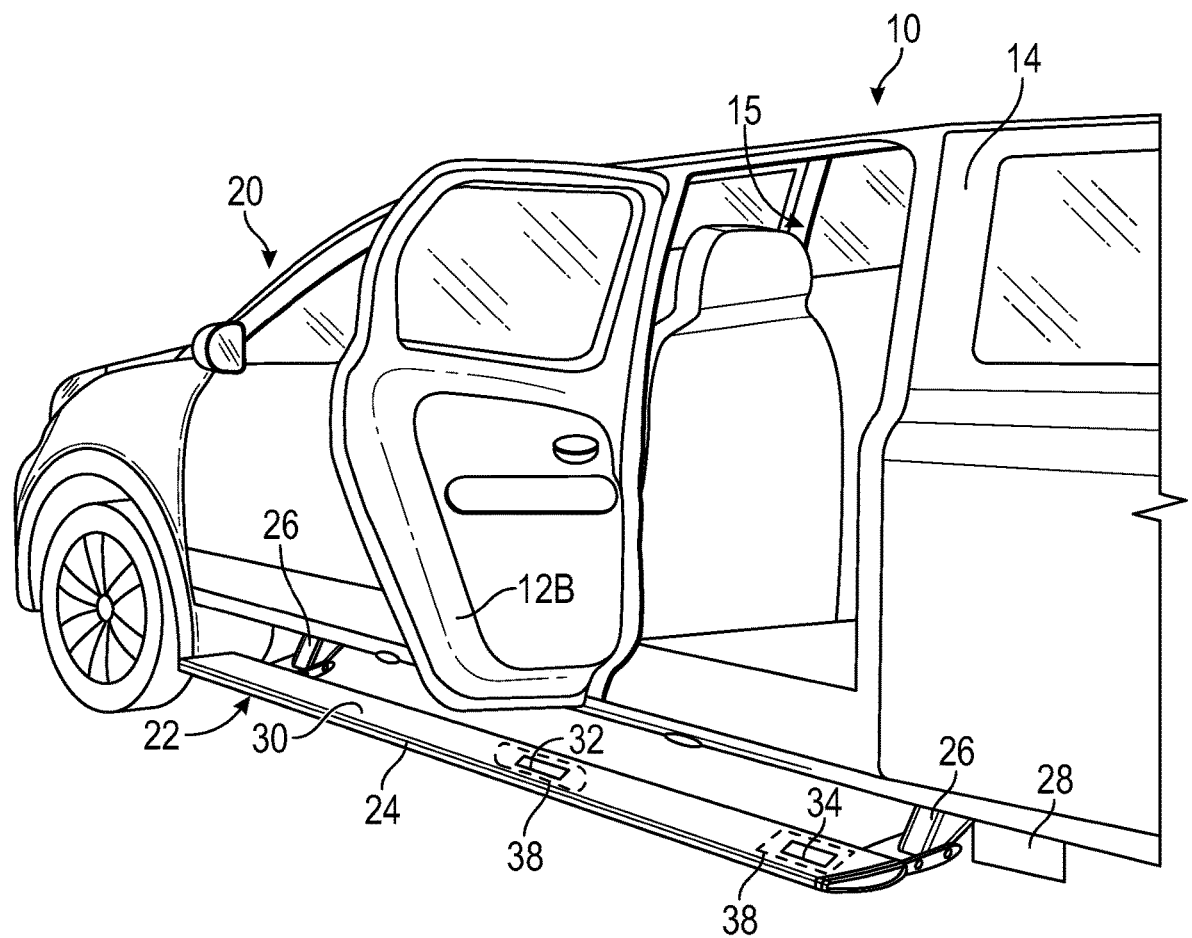
FIG. 3 illustrates an open position of a second closure member of the powered closure member system of FIG. 1.

FIGS. 1, 2, and 3 schematically illustrate select portions of a motor vehicle 10. The vehicle 10 may be a pickup truck, a sport utility vehicle (SUV), a van, or any other type of vehicle having a relatively high clearance C between a floor of the vehicle and a ground surface G. The vehicle 10 could also be a conventional motor vehicle, a battery powered hybrid or electric vehicle, or an autonomous vehicle (i.e., a driverless vehicle).

Although a specific component relationship is illustrated in the figures of this disclosure, the illustrations are not intended to limit this disclosure. The placement and orientation of the various components of the vehicle 10 are shown schematically and could vary within the scope of this disclosure. In addition, the various figures accompanying this disclosure are not necessarily to scale, and some features may be exaggerated or minimized to show certain details of a particular component.

The vehicle 10 may include a powered closure member system 20 that includes a plurality of closure members (e.g., doors, liftgates, tailgates, swing gates, etc.) that may be automatically moved between closed and open positions for accessing a vehicle interior 15 (e.g., a vehicle passenger cabin). In an embodiment, the powered closure member system 20 includes a first closure member 12A and a second closure member 12B that are mounted relative to a vehicle body 14 and are each configured to move between the closed and open positions for accessing the vehicle interior 15. In the illustrated embodiment, the closure members 12A, 12B are front and rear driver side doors, respectively, of the vehicle 10. While only driver side closure members 12A, 12B are shown in FIGS. 1-3, it should be understood that the powered closure member system 20 could include additional closure members on the passenger side of the vehicle 10. Furthermore, while a four-door arrangement is shown in the exemplary embodiments, the teachings of this disclosure may also extend to two-door arrangements or any other vehicle closure member arrangements.

The powered closure member system 20 may include one or more actuator systems 16 configured for automatically moving the closure member 12A and/or the closure member 12B to their respective open positions when an authorized user 18 is within a predefined threshold distance from the vehicle 10 and has indicated a desire to enter the vehicle 10. In an embodiment, each of the first closure member 12A and the second closure member 12B includes its own actuator system 16 for achieving the automated closure member movement between the closed and positions. In another embodiment, each actuator system 16 includes a power door actuator, such as a power door hinge, for example.

The vehicle 10 may further include a running board assembly 22 that may be movably mounted relative to the vehicle body 14, which may include portions of both the frame and the paneling of the vehicle 10. The running board assembly 22 may be movable between a retracted or stowed position and one or more deployed positions. In the one or more deployed positions, the user 18 may step on the running board assembly 22, such as for accessing the vehicle interior 15, for example. The running board assembly 22 is shown in one of the deployed positions in FIGS. 1-3.

In an embodiment, the running board assembly 22 includes a running board 24, two or more linkage assemblies 26, and a motor 28. The linkage assemblies 26 may secure the running board 24 to the vehicle body 14 and are configured to guide movement of the running board 24 between the stowed and deployed positions. The motor 28 may be configured to adjust a position of the running board 24 between the retracted and deployed positions. In an embodiment, the motor 28 is an electric motor.

When in one of the deployed positions, the user 18 may step on the running board 24 as they enter and exit the vehicle 10. Specifically, the user 18 may step on a deck 30 (or, step pad or stepping platform) of the running board 24, which in this example provides the uppermost surface of the running board 24.

The running board 24 extends along a length in a direction parallel to the "forward" and "rearward" directions, which are labeled in FIG. 1 and correspond to the normal "forward" and "rearward" orientations of the vehicle 10. The running board 24 may span a majority of the widths of the first and second closure members 12A, 12B. However, the size of the running board 24 is not intended to limit this disclosure. While only one running board assembly 22 is shown in FIG. 1, it should be understood that a similar running board assembly may be provided on an opposite side of the vehicle 10.

The running board assembly 22 may be a further component of the powered closure member system 20. In an embodiment, the running board assembly 22 may be configured to initiate an opening or closing sequence of one or both of the closure members 12A, 12B. For example, the running board assembly 22 may include a first sensor 32 and a second sensor 34 that are mounted on or integrated within the running board 24 of the running board assembly 22. Each of the first sensor 32 and the second sensor 34 may be configured to detect an input of the user 18 for indicating a desire to initiate the opening sequence of one or both of the closure members 12A, 12B. In an embodiment, the input is detected when the user 18 steps or taps on the deck 30 of the running board 24 with their limb 36 (e.g., a foot) in the vicinity of either the first sensor 32 or the second sensor 34. The limb 36 may therefore be utilized to actuate the first sensor 32 and/or the second sensor 34 for initiating the powered opening sequence of the closure member 12A and/or the closure member 12B. A subsequent actuation of either the first sensor 32 or the second sensor 34 may initiate a powered closing sequence of the closure member 12A or the closure member 12B. Thus, the running board assembly 22 may be configured to initiate both powered opening sequences and powered closing sequences of the powered closure member system 20.

In an embodiment, the first sensor 32 and the second sensor 34 are capacitive sensors. The first and second sensors 32, 34 may therefore be configured to detect the presence of the limb 36 based on capacitive changes sensed within electrical fields that are generated by the sensors 32, 34. Notably, contactless actuation of the first and second sensors 32, 34 may be made possible by utilizing capacitive sensors.

In another embodiment, the first sensor 32 and the second sensor 34 are membrane switches. The first and second sensors 32, 34 may therefore be configured to detect the presence of the limb 36 based on direct contact of the limb 36 with the sensor 32, 34. Direct contact closes a circuit, thereby indicating that the limb 36 has directly stepped on or tapped the first or second sensor 32, 34.

The first and second sensors 32, 34 may be located at any location along the length of the running board 32. The locations of the first and second sensors 32, 34 may be marked by an identifier 38 for aiding the user 18 to quickly identify where to place their limb 36 on the deck 30 in order to actuate the first sensor 32 or the second sensor 34. In an embodiment, the identifier 38 is applied to the deck 30 and includes a long persistence phosphor coating that allows the deck 30 to glow in order to mark the locations of the sensors 32, 34.

FIG. 2 illustrates a first condition of the powered closure member system 20 in which the input from the user 18 has been detected by the first sensor 32. In response to such a user input, the actuator system 16 responsible for movement of the first closure member 12A may be activated to move the first closure member 12A to the open position.

FIG. 3 illustrates a second condition of the powered closure member system 20 in which the input from the user 18 has been detected by the second sensor 34. In response to such a user input, the actuator system 16 responsible for movement of the second closure member 12B may be activated to move the second closure member 12B to the open position.

Figure 4:
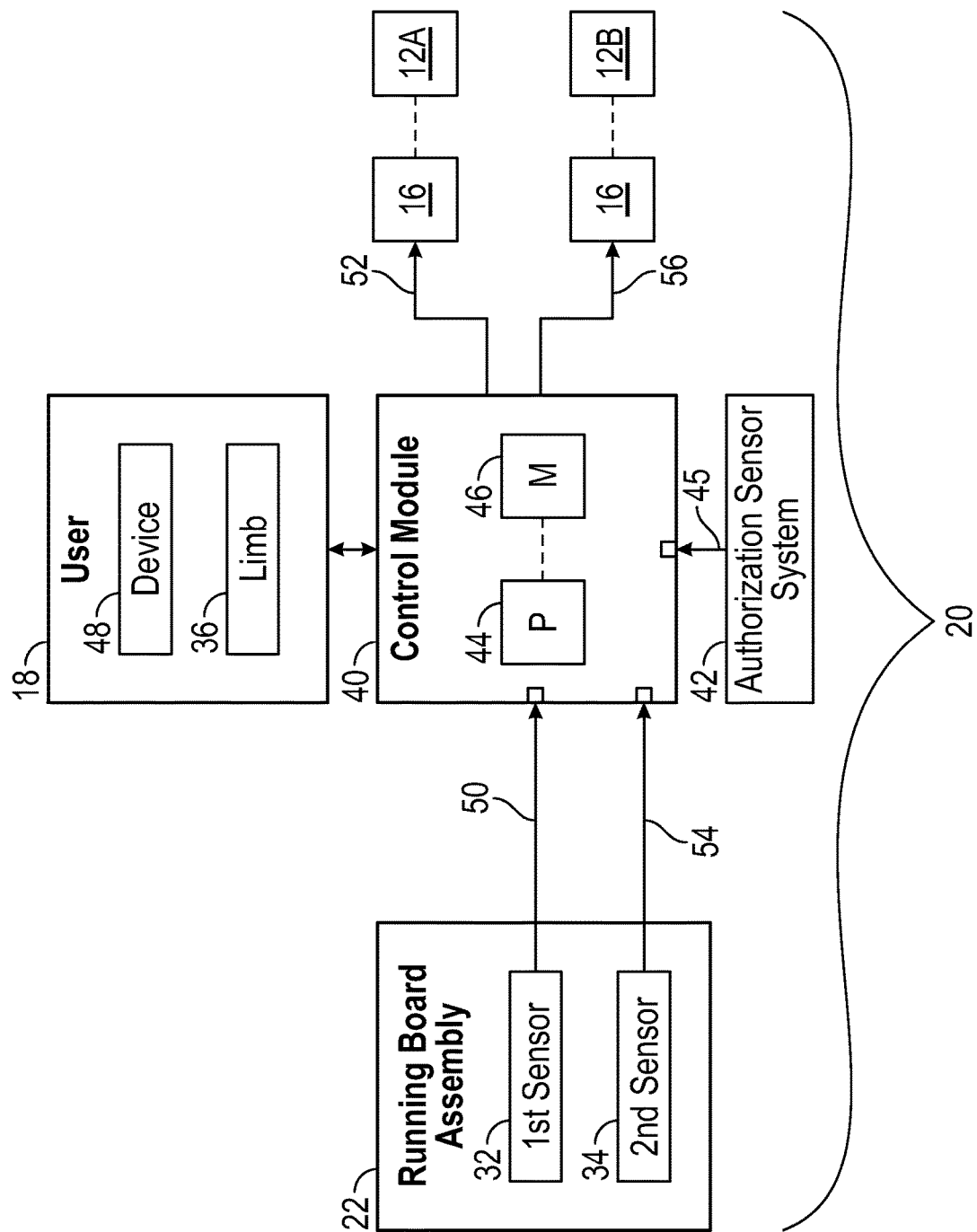
FIG. 4 is a block diagram further illustrating aspects of the powered closure member system of FIGS. 1-3 relative to a vehicle user.

FIG. 4, with continued reference to FIGS. 1-3, is a block diagram schematically illustrating further aspects of the powered closure member system 20. The powered closure member system 20 may include a control module 40 configured to control the various functions of the system. Although shown as a single control module in the highly schematic depiction of FIG. 4, the control module 40 could be part of a vehicle control system that includes multiple controllers configured to function together for coordinating the operations of the powered closure member system 20.

The control module 40 may be operably linked to the actuator system 16 associated with each of the first closure member 12A and the second closure member 12B, the first sensor 32 of the running board assembly 22, the second sensor 34 of the running board assembly 22, and an authorization sensor system 42 of the powered closure member system 20. The control module 40 could further be operatively linked to additional actuator systems and sensors associated with additional closure members of the vehicle 10.

The control module 40 may be equipped with executable instructions for interfacing with and commanding operation of various components of the powered closure member system 20, including but not limited to, the actuator systems 16 of the closure members 12A, 12B, for example. The control module 40 may include a processing unit 44 and non-transitory memory 46 for executing the various control strategies and modes of the powered closure member system 20. The processing unit 44 can be programmed to execute one or more programs stored in the memory 46. The program may be stored in the memory 46 as software code, for example. Each program stored in the memory 46 may include an ordered list of executable instructions for implementing logical functions associated with the powered closure member system 20.

The processing unit 44 can be a custom made or commercially available processor, a central processing unit (CPU), or generally any device for executing software instructions. The memory 46 can include any one or combination of volatile memory elements and/or nonvolatile memory elements.

The authorization sensor system 42 may include one or more sensors configured to communicate with a personal electronic device 48 of the user 18 when the personal electronic device 48 is within a threshold distance (e.g., about 2 meters) from the vehicle 10 in order to authenticate the user 18. In this disclosure, the term "about" means that the expressed quantities or ranges need not be exact but may be approximated and/or larger or smaller, reflecting acceptable tolerances, conversion factors, measurement error, etc. The personal electronic device 48 can be a key fob or a smartphone of the user 18, for example. The authorization sensor system 42 and the personal electronic device 48 may communicate via wireless signals, such as Bluetooth Low Energy (BLE) signals, for example, to provide an indication, such as via an input signal 45, to the control module 40 that the personal electronic device 48 is near the vehicle 10 and to indicate a direction of approach of the user 18. The authorization sensor system 42 may include one or more Bluetooth low energy transceiver antenna modules (BLEAMs) that are mounted within an applique of one or more pillars of the vehicle 10, for example.

In response to authenticating the user 18 within the threshold distance from the vehicle 10, the control module 40 may, in some embodiments, command the running board assembly 22 to move from the stowed position to a deployed position. This may include commanding the motor 28 to move the running board assembly 22 to the deployed position.

The control module 40 may, in another embodiment, wake the first and second sensors 32, 34, such as to begin emitting electric fields, when the user 18 is identified by the authorization sensor system 42 as being within the threshold distance from the vehicle 10. In further response to detecting the personal electronic device 48 within the threshold distance, the control module 40 may wake up various other vehicle components including the electronic latches of the actuator systems 16 that hold the closure members 12A, 12B in the closed positions, etc.

The control module 40 may be further programmed to activate the actuator system 16 associated with the first closure member 12A and/or the actuator system 16 associated with the second closure member 12B based on signals received from the first and second sensors 32, 34. For example, when the user 18 has indicated a desire to initiate an opening sequence of the first closure member 12A by activating the first sensor 32 with their limb 36, the first sensor 32 may communicate a first input signal 50 to the control module 40. The first input signal 50 indicates that the user 18 has initiated the opening sequence for the first closure member 12A. In response to receiving the first input signal 50, the control module 40 may communicate a first command signal 52 to the actuator system 16 of the first closure member 12A. The first command signal 52 includes instructions for opening the first closure member 12A. The first command signal 52 may command the actuator system 16 to transition an electronic latch to unlatch the first closure member 12A from the vehicle body 14 and then command the actuator system 16 to move the first closure member 12A to the open position, for example.

Alternatively, when the user 18 has indicated a desire to initiate an opening sequence of the second closure member 12B by activating the second sensor 34 with their limb 36, the second sensor 34 may communicate a second input signal 54 to the control module 40. The second input signal 54 indicates that the user 18 has initiated the opening sequence for the second closure member 12B. In response to receiving the second input signal 54, the control module 40 may communicate a second command signal 56 to the actuator system 16 of the second closure member 12B. The second command signal 56 includes instructions for opening the second closure member 12B. The second command signal 56 may command the actuator system 16 to transition an electronic latch to unlatch the second closure member 12B from the vehicle body 14 and then command the actuator system 16 to move the second closure member 12B to the open position, for example. In another embodiment, the control module 40 may command both closure members 12A, 12B to open at the same time when the first sensor 32 and the second sensor 34 are activated simultaneously.

The control module 40 may, in another embodiment, be programmed to distinguish between situations in which the user 18 desires to initiate the opening sequence of one of the closure members 12A, 12B and situations in which the user 18 is standing on the running board assembly 22, such as to view a cargo space of the vehicle 10, for example, and thus does not desire to initiate the powered opening sequence. In an embodiment, the control module 40 may be programmed to determine an amount of time the user's limb 36 has been actuating the first sensor 32 or the second sensor 34. When the time exceeds a predefined threshold (e.g., about 3 seconds), thus indicating that the user 18 is likely standing on the running board assembly 22 and thus does not wish to initiate the opening sequence, the control module 40 may decide not to communicate either of the command signals 52, 56 for activating the actuator systems 16.

In another embodiment, the control module 40 may be programmed to measure the amount of weight on the running board assembly 22 based on a stall force reading from the motor 28 to determine whether the user 18 is more than likely standing on the running board assembly 22. If the stall force reading indicates the user 18 is standing on the running board assembly 22, the control module 40 may decide not to communicate either of the command signals 52, 56 for activating the actuator systems 16.

Figure 5:
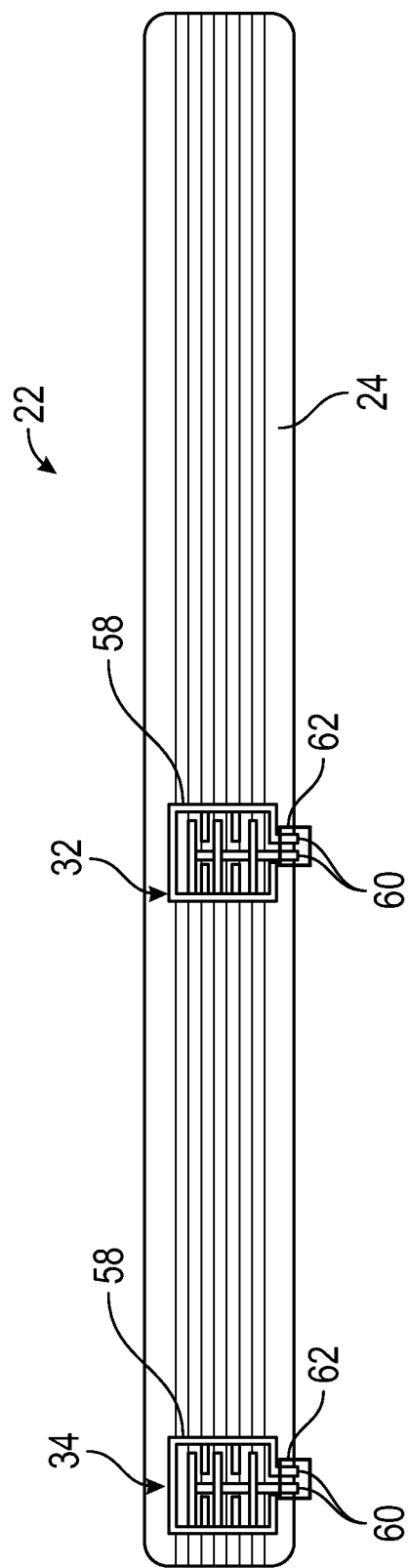
FIG. 5 illustrates an exemplary running board of a vehicle powered closure members system.

FIG. 5 illustrates an exemplary running board 24 of the running board assembly 22. The first sensor 32 and the second sensor 34 may be insert molded within the running board 24 as part of a two-shot injection molding process. Either a core pull or rotational platen two-shot mold may be used to mold the running board 24 with the integrated first and second sensors 32, 34. In this embodiment, the first and second sensors 32, 34 are capacitive sensors.

A first shot of material may provide the running board 24, and a second shot of material may provide capacitive tracks 58 of each of the first and second sensors 32, 34. The two-shot process therefore facilitates incorporating the first and second sensors 32, 34 within the running board 24 during the molding process.

In an exemplary embodiment, microconnectors 60 (e.g., gold plated leads) for each sensor 32, 34 may be positioned within a mold, and then the first shot of material may be injected around the microconnectors 60 to form the body of the running board 24. Next, a connector 62 may be inserted into the mold at the location of the microconnectors 60 for each of the first and second sensors 32, 34. Finally, the second shot of material may be injected in a predefined pattern for forming the capacitive tracks 58 of the first and second sensors 32, 34. The capacitive tracks 58 may be overmolded around the microconnectors 60 and may be encapsulated within the body of the running board 22. Together, the capacitive tracks 58, the microconnectors 60, and the connectors 62 establish the first and second sensors 32, 34 of the running board assembly 22.

In an embodiment, the first shot of material for forming the running board 24 includes a thermoplastic polyolefin (TPO). An exemplary TPO includes a polypropylene/high ethylene-octene copolymer. However, other materials for forming the running board 24 may also be suitable.

In another embodiment, the second shot of material for forming the capacitive tracks 58 of each of the first and second sensors 32, 34 includes a conducive polymer. The conductive polymer may include a base material and one or more conductive fillers. In an embodiment, the base material is a linear low-density polyethylene. However, other materials could alternatively be employed as part of the material make-up of the base material within the scope of this disclosure.

In another embodiment, the conductive fillers include a first conductive filler of graphene, such as GrapheneBlack™ sold by NanoXplore, and a second conductive filler that includes a carbon nanostructure. The carbon nanostructure is designed to grow single wall carbon nanotubes on a substrate such as glass fibers or spheres. The result is a unique morphology of cross-linked and branched carbon nanotubes which branch out with highly conductive pathways that, when combined with the graphene, create highly conductive electrical pathways within the plastic material. An exemplary carbon nanostructure may include Athlos™ CNS, sold by Cabot. However, other carbon nanostructures may also be employed within the scope of this disclosure.

The conductive polymer for forming the capacitive tracks 58 of each of the first and second sensors 32, 34 may further include a compatibilizer, an antioxidant, and a color concentrate. The compatibilizer may include a polyolefin adhesive or bonding agent for bonding the base material to the conductive fillers. An exemplary compatibilizer is Admer™ QF551E, sold by Misui Chemicals. However, other compatibilizers (e.g., maleic anhydride grafted polypropylene (MAPP), etc.) may alternatively be employed as part of the material make-up of the conductive polymer. The antioxidant may include a solid antioxidant for improving color stability and reducing oxidation during processing. An exemplary antioxidant is Ultranox® 815, sold by Addivant. The color concentrate may include CG5903, sold by Interlake, for example. However, other materials may also be employed as part of the material make-up of the conductive polymer.

Table 1, provided below, illustrates an exemplary formulation of the conductive polymer. The formulation is intended to be exemplary only, and thus other formulations are contemplated as within the scope of this disclosure. Each substituent component of the example formulation is defined in Table 1 as a percentage by weight relative to the total weight of the formulation.

TABLE 1

Exemplary Material Formulation of Conductive Polymer

| Material Category | Material | Formulation (% by weight) |
| --- | --- | --- |
| Base material | Prime LLDPE | 85.75 |
| Conductive filler 1 | GrapheneBlack ™ | 8 |
| Conductive filler 2 | Athlos ™ CNS | 2 |
| Compatibilizer | Admer ™ QF551A | 3 |
| Antioxidant | Ultranox ® 815 | 0.25 |
| Color concentrate | CB5903 | 1 |

Figure 6:
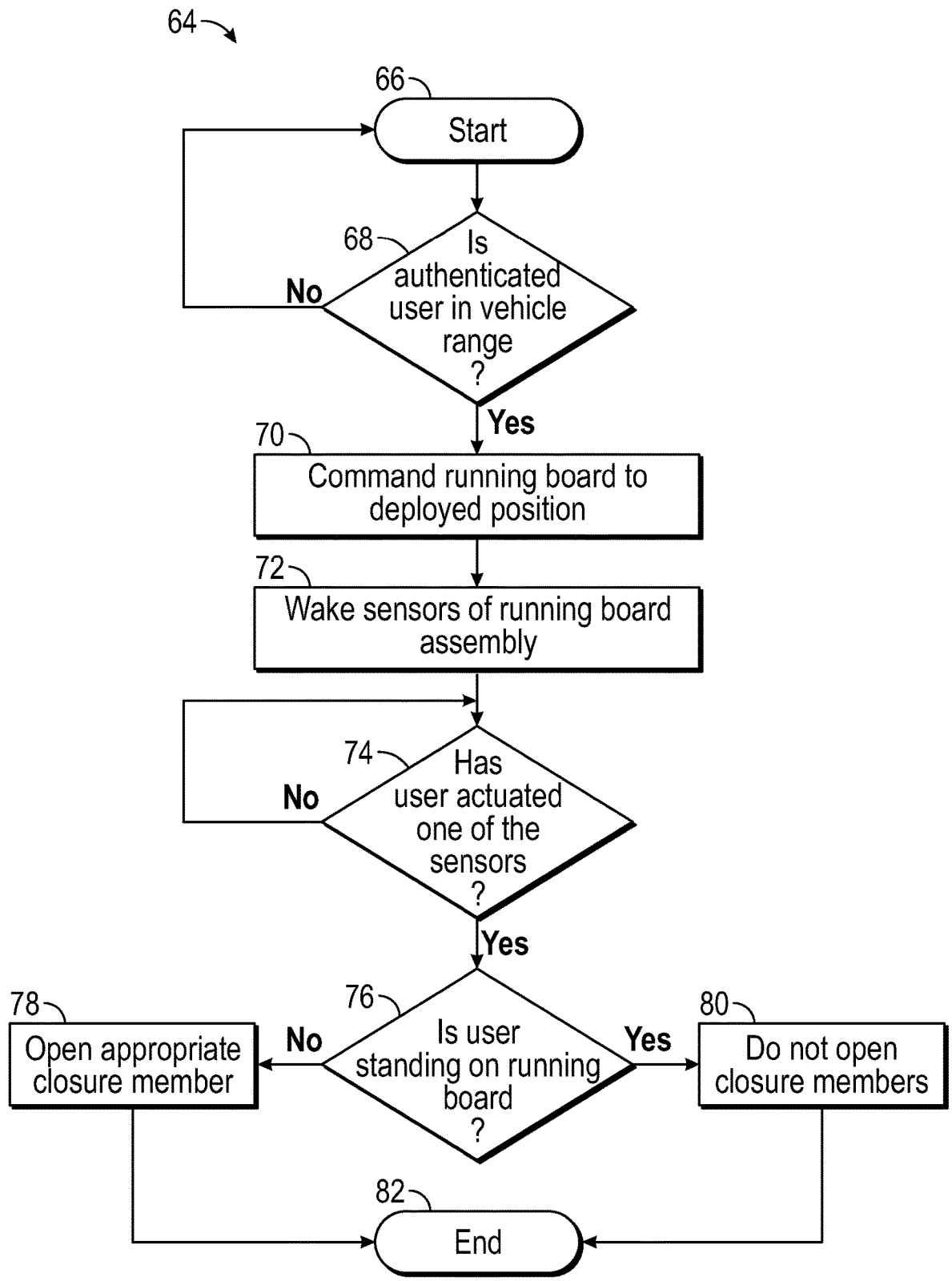
FIG. 6 schematically illustrates an exemplary closure member powered opening sequence of a vehicle powered closure member system.

FIG. 6, with continued reference to FIGS. 1-5, schematically illustrates a control strategy 64 for controlling the powered closure member system 20 for opening one of the closure members 12A, 12B when the user 18 has indicated a desired to enter the vehicle 10, such as by actuating one of the sensors 32, 34 with his/her limb 36, for example. In an embodiment, the control module 40 of the powered closure member system 20 is programmed with one or more algorithms adapted to execute the exemplary control strategy 64.

The exemplary control strategy 64 may begin at block 66. At block 68, the control strategy 64 determines whether the user 18 is an authorized user who is within the threshold distance or range from the vehicle 10. In an embodiment, the authorization sensor system 42 provides the input signal to the control module 40 when the authorized user 18 is detected within the threshold distance. The threshold distance may be about 2 meters from the vehicle 100, but could be defined at various other distances within the scope of this disclosure.

The control strategy 64 next proceeds to block 70 commanding the motor 28 of the running board assembly 22 to move the running board 24 from the stowed position to the deployed position. The first and second sensors 32, 34 of the running board assembly 22 may then be woken or otherwise enabled for sensing inputs from the user 18 at block 72.

Next, at block 74, the control strategy 64 may monitor the first and second sensors 32, 34 for determining whether or not the user 18 has actuated one of the sensors 32, 34 for initiating an opening sequence of one of the closure members 12A, 12B. If YES, the control strategy 64 may proceed to block 76 by determining whether the user 18 is standing on the running board 24, thus indicating that the opening sequence is not desired. If NO, the control strategy 64 may command the appropriate actuator system 16 to move the appropriate closure member 12A, 12B to the open position at block 78. IF YES, the closure members 12A, 12B are not opened at block 80. The control strategy 64 may end at block 82.

Figure 7:
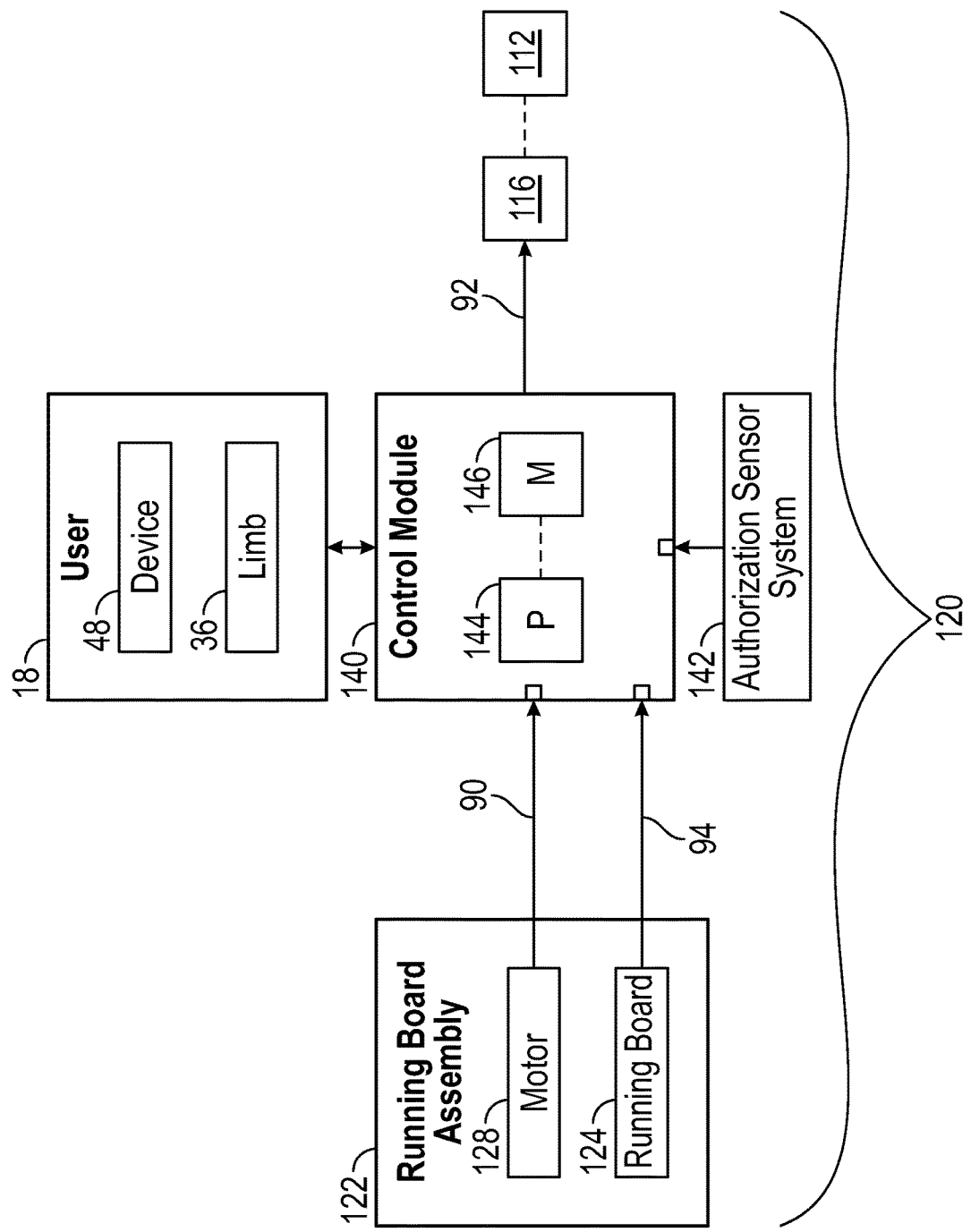
FIG. 7 illustrates another exemplary vehicle powered closure member system.

FIG. 7 schematically another exemplary powered closure member system 120 for a vehicle. The powered closure member system 120 is similar to the powered closure member system 20 discussed above. However, in this embodiment, the vehicle includes only a single powered closure member 112 per side, and a running board assembly 122 of the powered closure member system 120 lacks any built-in sensors for activating the opening sequence of the closure member 112. Instead, as is further discussed below, a running board 124 of the running board assembly 122 may be selectively configured to function as a switch for initiating the opening sequences of the closure member 112.

The powered closure member system 120 may include a control module 140 configured to control the various functions of the system. Although shown as a single control module in the highly schematic depiction of FIG. 7, the control module 140 could be part of a vehicle control system that includes multiple controllers configured to function together for coordinating the operations of the powered closure member system 120.

The control module 140 may be operably linked to an actuator system 116 associated with the closure member 112, a motor 128 of the running board assembly 122, and an authorization sensor system 142 of the powered closure member system 120. The control module 140 could further be operatively linked to additional actuator systems and sensors associated with additional closure members of the vehicle 10.

The control module 140 may be equipped with executable instructions for interfacing with and commanding operation of various components of the powered closure member system 120, including but not limited to, the actuator system 116 of the closure member 112 and the motor 128 of the running board assembly 122. The control module 140 may include a processing unit 144 and non-transitory memory 146 configured for executing the various control strategies and modes of the powered closure member system 120. The processing unit 144 can be programmed to execute one or more programs stored in the memory 146. The program may be stored in the memory 146 as software code, for example. Each program stored in the memory 146 may include an ordered list of executable instructions for implementing logical functions associated with the powered closure member system 120.

The authorization sensor system 142 may be include one or more sensors configured to communicate with a personal electronic device 48 of the user 18 when the personal electronic device 48 is within a threshold distance (e.g., about 2 meters) from the vehicle 10 in order to authenticate the user 18. The authorization sensor system 142 and the personal electronic device 48 may communicate via wireless signals, such as Bluetooth Low Energy (BLE) signals, for example, to provide an indication, via an input signal, to the control module 140 that the personal electronic device 48 is near the vehicle. The authorization sensor system 142 may include one or more Bluetooth low energy transceiver antenna modules (BLEAMs) that are mounted within an applique of one or more pillars of the vehicle, for example.

Figure 8:
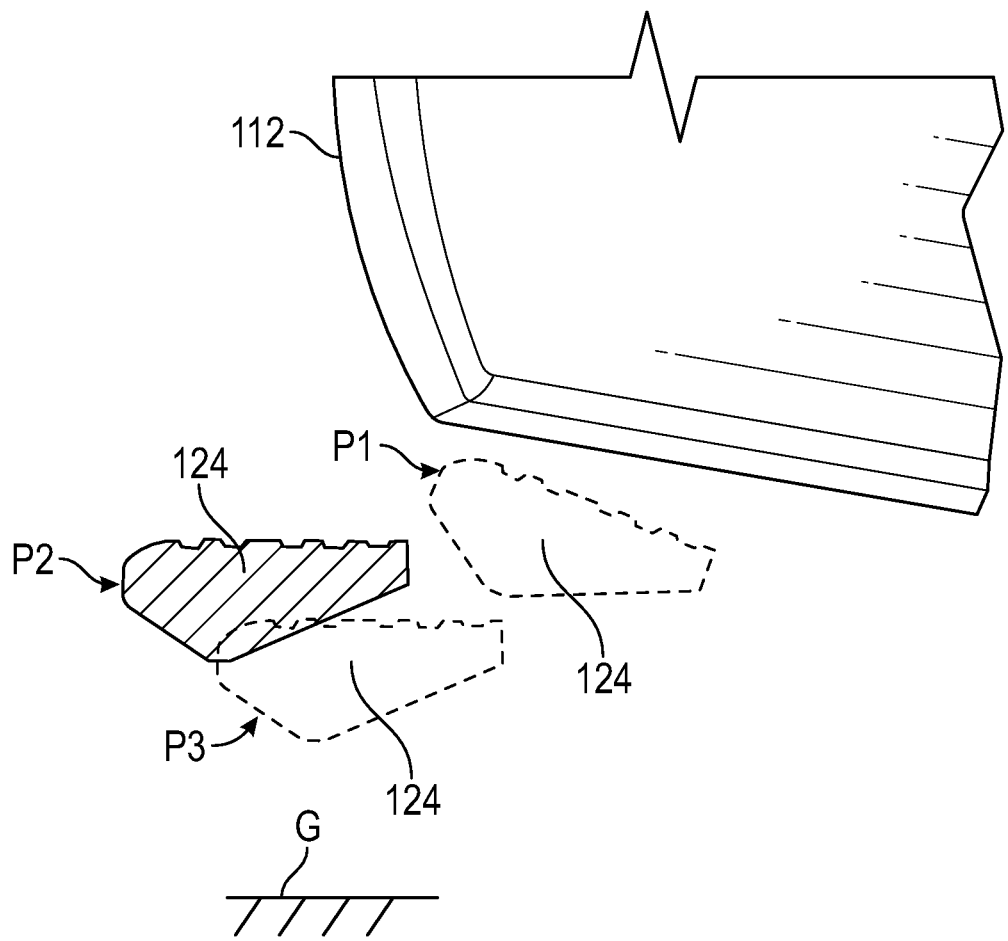
FIG. 8 illustrates a partially deployed position of a running board of the vehicle powered closure member system of FIG. 7.

In response to authenticating the user 18 within the threshold distance from the vehicle 10, the control module 140 may, in some embodiments, command the running board 124 of the running board assembly 122 to move from a stowed position P1 to a partially deployed position P2 (see, e.g., FIG. 8). In an embodiment, the partially deployed position P2 is slightly raised compared to a fully deployed position P3 (see FIG. 8) of the running board assembly 122. In another embodiment, the partially deployed position P2 is about 90% of a total travel distance of the fully deployed position P3. However, other ratio thresholds are also contemplated within the scope of this disclosure. Commanding the running board 124 to the partially deployed position P2 may include commanding the motor 128 to move the running board assembly 22 to the partially deployed position P2.

The control module 140 may be further programmed to determine whether the user 18 has indicated a desire to initiate the opening sequence of the closure member 112 prior to activating the actuator system 116 for moving the closure member 112 to the open position. The control module 140 may be programmed to distinguish between different inputs of the user 18 for making such a determination. For example, the running board assembly 122 may move to the fully deployed position P3 when the user 18 steps on the running board 124. The motor 128 may then be controlled by the control module 140 to supply a current necessary for raising the running board 124 back to the partially deployed position P2. If the running board 124 raises to the partially deployed position P2, thus indicating that the user is likely not standing on the running board 124, the motor 128 may communicate a first input signal 90 to the control module 140. The control module 140 may communicate a first command signal 92 to the actuator system 116 of the closure member 112 in response to receiving the first input signal 90. The first command signal 92 may include instructions for opening the closure member 112.

Alternatively, if the running board assembly 122 does not raise back up to the partially deployed position P2 in response to the current supplied by the motor 128, thus indicating that the user 18 is likely standing on the running board 124, the motor 128 may communicate a second input signal 94 to the control module 140. The second input signal 94 indicates that the control module 140 should not activate the actuator system 116 for moving the closure member 112 to the open position.

Figure 9:
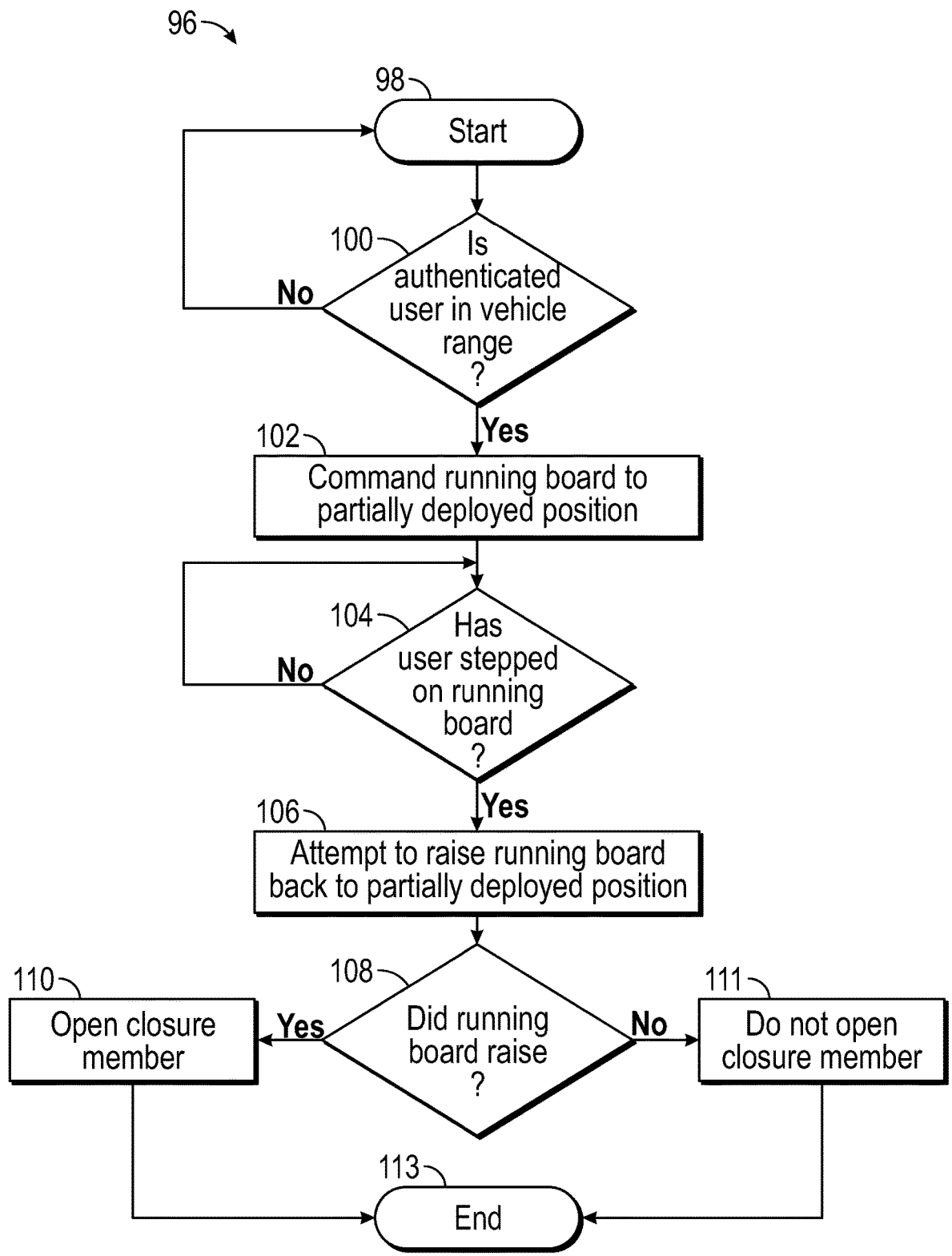
FIG. 9 schematically illustrates an exemplary closure member powered opening sequence of the vehicle powered closure member system of FIG. 7.

FIG. 9, with continued reference to FIGS. 7-8, schematically illustrates a control strategy 96 for controlling the powered closure member system 120 for opening the closure member 112 when the user 18 has indicated a desire to enter a vehicle equipped with the system 120, such as by stepping on the running board 124 of the running board assembly 122 with his/her limb 36. In an embodiment, the control module 140 of the powered closure member system 120 is programmed with one or more algorithms adapted to execute the exemplary control strategy 96.

The exemplary control strategy 96 may begin at block 98. At block 100, the control strategy 96 may determine whether the user 18 is an authorized user who is within the threshold distance or range from the vehicle. In an embodiment, the authorization sensor system 142 provides an input signal to the control module 140 when the authorized user 18 is detected within the threshold distance.

The control strategy 96 may proceed, when the user 18 is within range of the vehicle, to block 102 by commanding the motor 128 of the running board assembly 122 to move the running board 124 from the stowed position P1 to the partially deployed position P2. At block 104, the control strategy 96 may monitor whether the user 18 has stepped on the running board 124. If YES, the control strategy 96 may proceed to block 106 by commanding the motor 128 to apply a current for raising the running board assembly 122 back to the partially deployed position.

The control strategy 96 may next determine, at block 108, whether the running board assembly 122 was raised back to the partially deployed position P2 in response to the current from the motor 128. If YES, the control strategy 96 may command the actuator system 116 to move the closure member 112 to the open position at block 110. IF NO, the closure member 112 is not opened at block 111. The control strategy 96 may end at block 113.

The powered closure member systems of this disclosure utilize running board activated powered door opening sequences. The systems therefore provide a low-cost option for providing powered door features when the vehicle is not equipped with cameras and other relatively expensive sensing technologies. The systems are user friendly and reliable, thereby improving customer satisfaction.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A powered closure member system for a vehicle, comprising:
   a closure member; and
   a running board assembly configured to initiate a powered opening or closing sequence of the closure member,
   wherein the running board assembly includes a first sensor configured to receive a user input for initiating the powered opening or closing sequence of the closure member,
   wherein a location of the first sensor is marked by an indicator for enabling a user to identify where to actuate the first sensor,
   wherein the first sensor includes a capacitive track encapsulated within a body of a running board of the running board assembly, a microconnector connected to the capacitive track, and a connector received around the microconnector and extending outside of the body.

2. The powered closure member system as recited in claim 1, wherein the running board assembly includes a second sensor configured to receive a second user input for initiating a second powered opening or closing sequence of a second closure member.

3. The powered closure member system as recited in claim 1, wherein the first sensor is integrated within the running board of the running board assembly and is a capacitive sensor or a membrane switch.

4. The powered closure member system as recited in claim 1, comprising an actuator system configured to move the closure member from a closed position to an open position or from the open position to the closed position in response to initiating the powered opening or closing sequence.

5. The powered closure member system as recited in claim 4, comprising a control module programmed to command the actuator system to move the closure member to the open position in response to receiving notification of the user input for initiating the powered opening sequence of the closure member.

6. The powered closure member system as recited in claim 5, wherein the control module is programmed to distinguish between the user input for initiating the powered opening sequence and a second user input that is not designed to initiate the powered opening sequence.

7. The powered closure member system as recited in claim 6, wherein the control module is programmed to determine that the second user input has been received when a length of time a sensor of the running board assembly has been actuated exceeds a predefined threshold or based on a measured amount of weight being applied to the running board assembly.

8. The powered closure member system as recited in claim 1, wherein the running board of the running board assembly is configured to function as a switch for initiating the powered opening or closing sequence of the closure member.

9. The powered closure member system as recited in claim 8, wherein the running board is configured to receive the user input for moving the running board from a partially deployed position to a fully deployed position, and further wherein a motor of the running board is configured to supply a current necessary for raising the running board back to the partially deployed position.

10. The powered closure member system as recited in claim 9, comprising a control module configured to determine that the switch has been activated when the running board returns to the partially deployed position in response to the current.

11. The powered closure member system as recited in claim 1, wherein the indicator includes a long persistence phosphor coating applied to a deck of the running board of the running board assembly.

12. The powered closure member system as recited in claim 1, wherein the capacitive track includes a conductive polymer having a base material and a conductive filler that includes a carbon nanostructure for establishing an electrical pathway within the body of the running board.

13. A powered closure member system for a vehicle, comprising:
a closure member;
an actuator system configured to move the closure member between a closed position and an open position;
a running board assembly configured to receive a user input initiating a powered opening or closing sequence of the closure member; and
a control module programmed to command the actuator system to move the closure member to the open position or the closed position in response to the user input,
wherein the control module is programmed to distinguish between the user input and a second user input that does not initiate the powered opening or closing sequence,
wherein the control module is further programmed to determine that the second user input has been received when a stall force reading of a motor of the actuator system indicates that a user is standing on a running board deck of the running board assembly.

14. The powered closure member system as recited in claim 13, wherein the closure member is a side door of the vehicle.

15. The powered closure member system as recited in claim 13, wherein the running board assembly includes a capacitive sensor configured to receive the user input for initiating the powered opening or closing sequence.

16. The powered closure member system as recited in claim 15, wherein the running board deck of the running board assembly comprises a thermoplastic olefin, and the capacitive sensor comprises a conductive polymer that is encapsulated within the thermoplastic olefin.

17. The powered closure member system as recited in claim 13, wherein the user input includes placement of a limb of the user on the running board deck of the running board assembly.

18. The powered closure member system as recited in claim 13, wherein the running board deck of the running board assembly is configured to function as a switch for initiating the powered opening or closing sequence of the closure member, wherein the control module is programmed to determine that the switch has been activated subsequent to the user input when the running board deck moves from a fully deployed position to a partially deployed position in response to a current supplied by a motor of the running board assembly.

19. A powered closure member system for a vehicle, comprising:
a closure member;
an actuator system configured to move the closure member between a closed position and an open position;
a running board assembly configured to receive a first user input to initiate a powered opening or closing sequence of the closure member and a second user input that does not initiate the powered opening or closing sequence; and
a control module programmed to command the actuator system to move the closure member to the open position or the closed position in response to the first user input but not the second user input,
wherein the first user input occurs when a user places a foot on a running board deck of the running board assembly for a first length of time that is less than a predefined threshold,
wherein the second user input occurs when the user places the foot on the running board deck for a second length of time that is greater than the predefined threshold.

* * * * *